(12) United States Patent
Jaeger et al.

(10) Patent No.: US 9,347,400 B2
(45) Date of Patent: May 24, 2016

(54) ROCKET STAGE HAVING ENGINE THRUST FRAME INTEGRATED WITH TANK

(71) Applicant: Astrium GmbH, Taufkirchen (DE)

(72) Inventors: Markus Jaeger, Bremen (DE); Menko Wisse, Bremen (DE); Jesus Gomez Garcia, Bremen (DE)

(73) Assignee: Astrium GmbH, Taufkirchen (DE)

( * ) Notice: Subject to any disclaimer, the term of this patent is extended or adjusted under 35 U.S.C. 154(b) by 880 days.

(21) Appl. No.: 13/684,729

(22) Filed: Nov. 26, 2012

(65) Prior Publication Data

US 2013/0263573 A1    Oct. 10, 2013

(30) Foreign Application Priority Data

Nov. 25, 2011   (DE) .......................... 10 2011 119 921

(51) Int. Cl.
F02K 9/60 (2006.01)
F02K 9/42 (2006.01)

(52) U.S. Cl.
CPC . F02K 9/605 (2013.01); F02K 9/42 (2013.01); F02K 9/60 (2013.01)

(58) Field of Classification Search
CPC ............. F02K 9/42; F02K 9/60; F02K 9/605; F02K 9/97
See application file for complete search history.

(56) References Cited

U.S. PATENT DOCUMENTS

| | | | | |
|---|---|---|---|---|
| 2,902,822 A | * | 9/1959 | McKiernan | 60/39.48 |
| 3,246,394 A | * | 4/1966 | Meyer | 29/446 |
| 3,286,882 A | * | 11/1966 | Tripp | 222/61 |
| 3,426,529 A | * | 2/1969 | Kircher et al. | 60/39.48 |
| 3,943,706 A |   | 3/1976 | Grafwallner et al. | |
| 4,733,531 A | * | 3/1988 | Grove | 60/259 |
| 5,085,343 A | * | 2/1992 | Scarr | 220/560.1 |
| 6,360,993 B1 |   | 3/2002 | Turner | |
| 6,499,287 B1 | * | 12/2002 | Taylor | 60/204 |
| 6,726,154 B2 |   | 4/2004 | Casillas et al. | |
| 6,745,983 B2 | * | 6/2004 | Taylor | 244/135 R |
| 7,093,337 B1 | * | 8/2006 | Taylor | 29/469 |
| 2009/0134170 A1 |   | 5/2009 | Behruzi et al. | |

FOREIGN PATENT DOCUMENTS

| | | |
|---|---|---|
| CN | 1270304 A | 10/2000 |
| CN | 1421673 A | 6/2003 |
| CN | 101268302 A | 9/2008 |
| WO | WO 2010/037561 | 4/2010 |

OTHER PUBLICATIONS

Chinese Search Report issued May 19, 2015 in Chinese Patent Application 2012104756343.

* cited by examiner

Primary Examiner — Lorne Meade
(74) Attorney, Agent, or Firm — W. F. Fasse

(57) ABSTRACT

A rocket stage for a spacecraft includes an engine, a tank for storing a fuel and an oxidizer for combustion in the engine, a rocket stage primary structure, and an engine thrust frame that connects and transmits forces between the engine and the primary structure. The engine thrust frame includes at least an internal part thereof arranged internally within the tank. This internal part of the engine thrust frame forms an imperforate partition that divides an interior space of the tank into at least two chambers for storing the fuel and the oxidizer separately from one another. Propellant management devices including liquid guide vanes and refillable liquid reservoirs may be provided in connection with the partition in the tank interior space.

20 Claims, 5 Drawing Sheets

ROCKET STAGE HAVING ENGINE THRUST FRAME INTEGRATED WITH TANK

PRIORITY CLAIM

This application is based on and claims the priority under 35 USC 119 of German Patent Application DE 10 2011 119 921.0, filed on 25 Nov. 2011, the entire disclosure of which is incorporated herein by reference.

FIELD OF THE INVENTION

The invention relates to a rocket stage for operating spacecraft with a primary structure, a tank for the separated storage of fuel and oxidizer, an engine and an engine thrust frame that connects the various components with one another.

BACKGROUND INFORMATION

The launch vehicle or booster rocket stages presently in use with liquid propulsion systems include a series of components that fulfill various different functions. This includes tanks for storing fuel and oxidizer, whereby the fuel and the oxidizer are stored either in separate tanks or in one tank with a partition separating wall between fuel and oxidizer, as well as a so-called engine thrust frame, designated as an Engine Thrust Frame (ETF) in English. The latter transmits the loads of the engine into the tank and into the primary structure on the one hand, and the loads of the launcher or booster via the primary structure into the tank and the engine on the other hand. Conventionally, the engine thrust frame is separate from and external to the propellant tank(s), and e.g. extends externally around the tank from the engine to the primary structure so as to transmit forces from the engine to the primary structure and vice versa. Furthermore, such rocket stages include propellant handling or management devices, designated as Propellant Management Devices (PMD) in English, which serve, among other things, for ensuring the supply of gas-free and particle-free propellant to the engine even when there is only a minimum remaining propellant residual quantity, or for suppressing the spinning of the liquid. It is desirable to reduce the size, mass and complexity of the overall structure in order to reduce the cost, increase the payload capacity and/or allow the shape and configuration of the rocket stage to be optimized.

SUMMARY OF THE INVENTION

In view of the above it is an object of the invention to further develop a rocket stage of the initially mentioned type, so that it has a lowest possible weight and a compact design and causes the lowest possible costs. Furthermore, the invention aims to avoid or overcome the disadvantages of the prior art, and to achieve additional advantages, as apparent from the present specification. The attainment of these objects is, however, not a required limitation of the invention or inventions defined in the appended claims.

The above objects have been integrated in a rocket stage according to the invention, wherein at least a part of the engine thrust frame is arranged in the interior of the tank, whereby this internal part of the engine thrust frame within the tank forms an imperforate partition that is embodied completely closed or solid in such a manner so that regions or chambers separated from one another by the partition are formed in the tank for respectively separately storing the components of the propellant. The term imperforate means that the partition has no holes or openings penetrating therethrough, through which a propellant component (e.g. fuel or oxidizer) could flow, so that the chambers are separated from one another by the imperforate partition.

By integrating the tank and the engine thrust frame into one unit, the invention achieves an extremely compact arrangement and simultaneously a considerable weight reduction. Moreover, in this manner also the weight of the adjoining structures can be correspondingly reduced. Through the compact design, the total length of the inventive rocket stage is considerably smaller than that of conventional configurations, which in turn effectively and permanently reduces the mechanical loads such as wind loads and the loads induced by the payload. Additionally, through the inventive embodiment of the rocket stage, the various different functions are optimally distributed to the individual components. Thus, the substantially conically shaped tank-internal part of the engine thrust frame is used not only for transmitting thrust forces between the engine and the primary structure of the rocket stage, but also as a partition in the tank for separating the fuel and the oxidizer in separate chambers in the tank. Moreover it reduces the geometric residuals.

Through the integration of also the propellant management devices provided in an advantageous further development of the invention, the compactness of the arrangement is still further improved. Simultaneously, the components of the propellant management devices, such as guide plates and refillable liquid reservoirs, are also used for the force introduction. Namely, these propellant management devices also supplement of contribute to the mechanical strength and load-transmitting capacity of the internal part of the engine thrust frame. Finally, the rocket stage according to the invention has the reignition capability that is necessary in special cases.

BRIEF DESCRIPTION OF THE DRAWINGS

In order that the invention may be clearly understood, it will now be described in further detail, in connection with example embodiments, with reference to the accompanying drawings, wherein.

DETAILED DESCRIPTION OF PREFERRED EXAMPLE EMBODIMENTS AND OF THE BEST MODE OF THE INVENTION

In the figures, the same components or components corresponding to one another have the same reference numbers.

Figure 1:
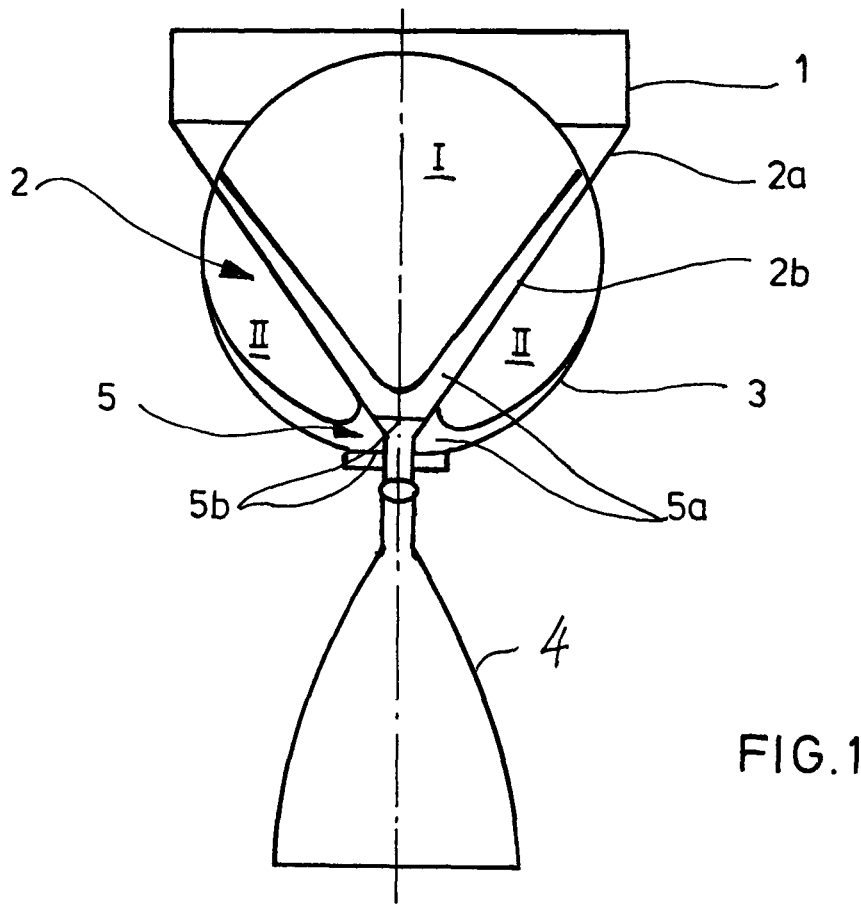
FIG. 1 shows a part of a rocket stage in a sectioned illustration.

FIG. 1 shows, in a schematic illustration, a vertical section through an inventive rocket stage, in which a substantially conically shaped engine thrust frame 2 is joined onto an engine 4 and a primary structure 1, e.g. a main load carrying structure, of the rocket stage. Thereby, the engine thrust frame 2 transmits the arising loads or forces between the engine 4 and the primary structure 1. A propellant tank 3 is spherically shaped in the embodiment illustrated here, and stores propellant components, i.e. fuel 6 and oxidizer 7 for combustion in the engine 4. A predominant or main part, namely an internal part 2b of the engine thrust frame 2 is arranged in the tank interior space of the tank 3 and thereby integrated in or with the tank 3. The engine thrust frame 2 in this embodiment further includes an outer ring 2a, which is preferably shaped as a conical frustum ring, and is located outside of the tank 3 and connected to the primary structure 1 of the rocket stage. The internal part 2b and the external part 2a of the engine thrust frame 2 are connected with one another in a load-transmitting or force-transmitting manner. This can be achieved in different ways. For example, in one embodiment the internal part 2b and the external part 2a are continuously directly connected with one another, or continuously integral with one another as one piece, whereby the engine thrust frame penetrates through a tank wall of the tank 3, which must be suitably connected and sealed in a pressure tight manner at the penetration junction. As another example, in another embodiment the internal part 2b and the external part 2a are separate and discontinuous from one another but are aligned with one another and connected on opposite sides of the tank wall of the tank 3, so that forces are transmitted through the tank wall between the internal part 2b and the external part 2a.

As can be seen from the figure, in this arrangement, the tank 3 and engine thrust frame 2, which are typically arranged separately from one another in conventional rocket stages, are here inventively connected and integrated with one another, without being limited or impaired in their respective functions. In fact, the inventive integration of the engine thrust frame 2 into the tank 3 gives the internal part 2b of the engine thrust frame 2 two additional functions, as will be described in the following.

As a first additional function, the internal part 2b of the engine thrust frame 2 serves as a partition or separating wall that divides the interior space of the tank 3 into two regions or chambers I and II for separately storing the propellant components. For example, the first region or chamber I stores the oxidizer 7, and the second region or chamber II stores the fuel 6. Thereby an arrangement of several separate tanks or the installation of an additional partition or separating wall in the single tank is not necessary. Furthermore, by providing an intelligent pressure control between the two tank regions I and II, the structural mass of the conically shaped separating wall 2b (i.e. the internal part 2b of the engine thrust frame 2) can be reduced to a minimum.

In that regard, the substantially spherical shape of the tank 3 illustrated in FIG. 1 represents the optimal shape of a pressurized tank for storing fuel and oxidizer, insofar as exclusively the occurrence of pressure loads is being considered. Because the engine 4, as also shown in FIG. 1, is connected with the rest of the rocket stage only at one location (i.e. at the bottom vertex of the substantially conical engine thrust frame), and the primary structure 1 has an essentially cylindrical shape, therefore the conical shape of the engine thrust frame 2 is the optimal shape for transmitting forces between the cylinder of the primary structure 1 and the single connection point for the engine 4. Thus, by arranging a major part 2b of the engine thrust frame 2 internally within the tank 3, this allows the force transmission paths to be optimized (e.g. with the conical shape of the internal part 2b of the engine thrust frame, and the spherical shape of the tank wall of the tank 3), and therefore allows the structural dimensions of the engine thrust frame and the tank wall to be minimized for carrying the arising loads.

Furthermore, as another additional function, the internal part 2b of the engine thrust frame 2 participates in the propellant management functions. Namely, the arrangement illustrated in FIG. 1 incorporates propellant management devices 5 including propellant guide plates 5a and at least one refillable liquid reservoir 5b connected or integrated with the internal part 2b of the thrust frame 2. The guide plates 5a extend radially to the central axis of symmetry of the rocket stage and connect the widest part of the tank 3 with the tank outlet, in order to suppress the spinning of the respective liquid propellant component and in order to collect and guide it to the respective tank outlet. The refillable liquid reservoirs 5b are secured above the tank outlets and hold a sufficient liquid quantity at the outlet, on the one hand to ensure that the liquid supplied from the tank is gas-free due to surface tension forces, and on the other hand to ensure that propellant is immediately available for a renewed ignition of the engine 4, even before the engine's burn thrust causes an acceleration that drives the rest of the propellant to the tank outlet. In that regard, the guide plates 5a and the refillable liquid reservoirs 5b are arranged in both regions I and II of the tank 3. Namely, guide plates 5a1 are arranged on the thrust frame internal part 2b in the chamber I for the oxidizer 7, and guide plates 5a2 are arranged on the tank wall of the tank 3 and partially span like a web to the thrust frame internal part 2b in the chamber II for the fuel 6. A reservoir 5b1 for the oxidizer 7 is arranged at the bottom vertex of the thrust frame internal part 2b, and a reservoir 5b2 for the fuel 6 is arranged at the bottom of the tank wall of the tank 3 concentrically or coaxially around the reservoir 5b1. The several propellant management devices 5, i.e. 5a1, 5a2, 5b1 and 5b2 provide typical capillary and surface tension effects to accumulate, guide and hold the fuel 6 and oxidizer 7 in the area of the tank chamber outlets.

Figure 2:
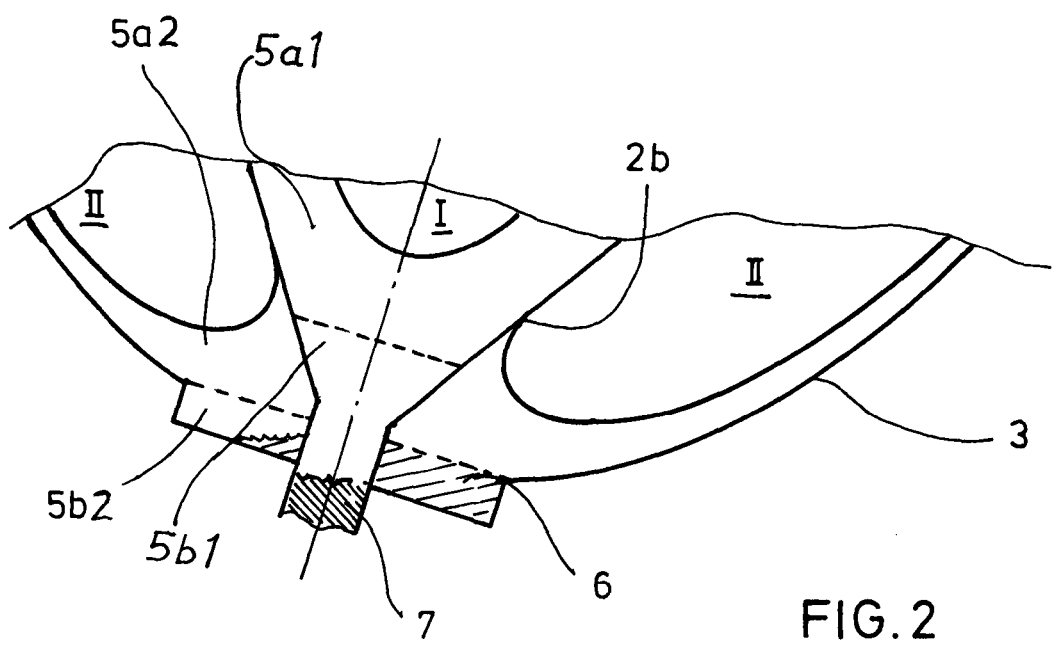
FIG. 2 is an enlarged illustration of a partial area of the arrangement according to FIG. 1.

The enlarged illustration of a partial area of the above described arrangement in FIG. 2 shows how possible residual quantities of fuel 6 and oxidizer 7 accumulate in the area of the propellant management devices 5 with a maximum permissible angle, at the end of the last burn phase of the rocket stage. Through the longitudinal acceleration, the liquids 6 and 7 are pressed in the direction toward the tank bottom or floor, where the engine 4 is arranged and where the tank outlet pipe stubs to the propellant feed lines are located. Due to the individual angles or corners near the tank bottom within the integrated geometry of the tank 3 and the conically shaped engine thrust frame 2, the residual propellant quantities 6 and 7 are reduced in comparison to those in conventional tanks. Namely, basically the total volume in the tank interior space at the bottom of the tank has been divided between the two chambers I and II for the oxidizer 7 and the fuel 6, so that the residual volume of each propellant component is reduced. Also, due to the configuration at the bottom of the two chambers I and II, with the conical thrust frame internal part 2b arranged inside the tank wall of the tank 3, therefore the convergence angles at the bottom of the tank are made narrower than in a conventional tank without the internal frame part 2b. Overall, the integrated tank form thus leads to an approximately 50% reduction of the residual propellant quantities 6, 7 in comparison to those in conventional tanks. Surface tension forces, which are induced by the existing corners, still further reduce these residual propellant quantities, even without requiring the installation of additional propellant management devices to achieve this.

Figure 3:
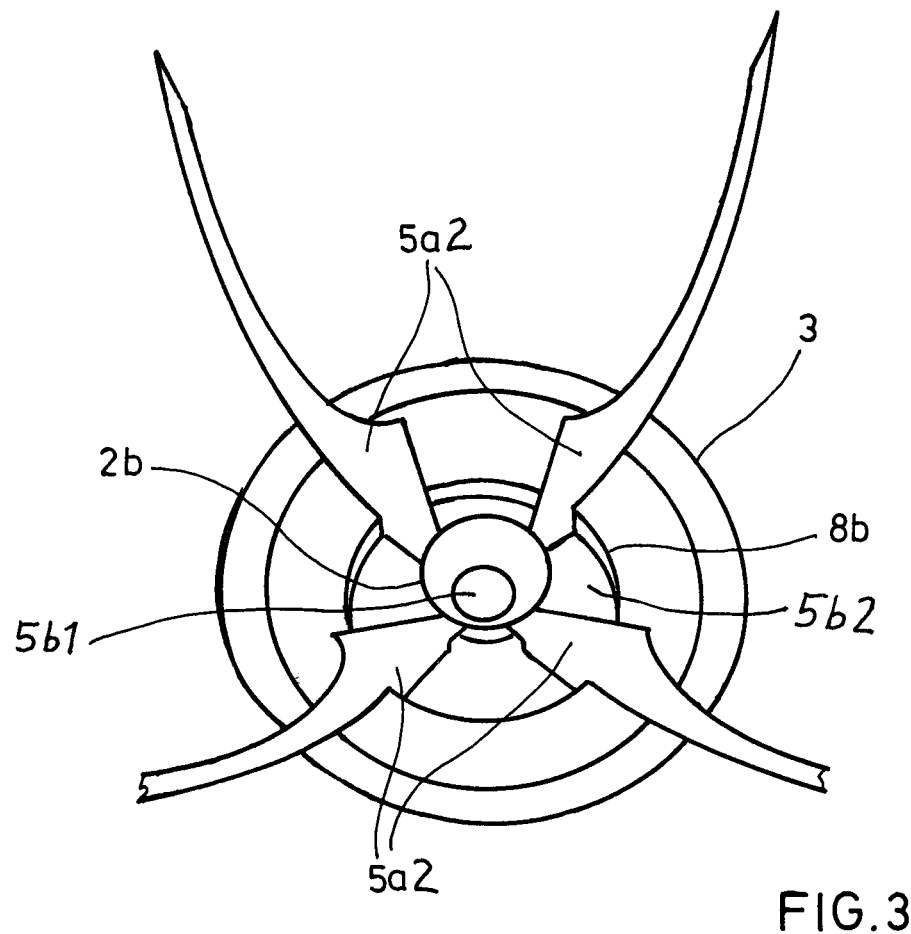
FIG. 3 is a different view of an enlarged partial area of the arrangement according to FIG. 1, in the vicinity of the bottom outlets of the tank, showing only a cutaway bottom portion of the internal part of the engine thrust frame and of the outer tank wall, with propellant guide plates arranged therein.
Figure 4:
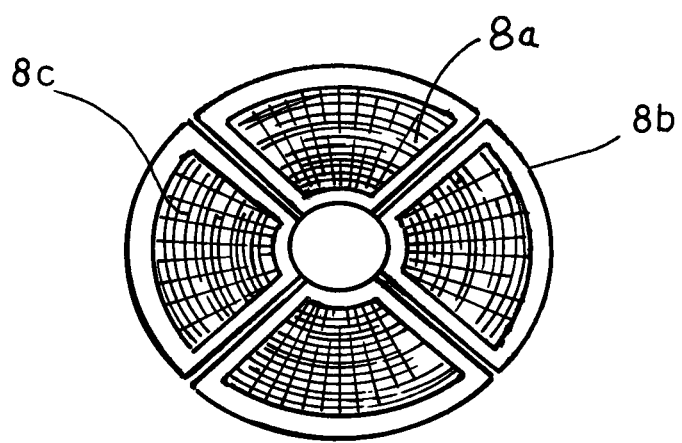
FIG. 4 is a further enlarged illustration of a partial area of the arrangement according to FIG. 3, FIGS. 5-7 are schematic sectional illustrations of various shapes of tanks for a rocket stage.

FIGS. 3 and 4 show further enlarged illustrations of a partial area of the arrangement according to FIG. 1, at the bottom of the tank 3 and especially in the region or chamber II with the guide plates 5a2 as well as the refillable liquid reservoir 5b2, which comprises throughflow openings 8a covered by screens or sieves 8c, which are supported by a disc-shaped reinforcement 8b. Note that FIG. 3 shows only a cut-away bottom portion of the outer wall of the tank 3 and a cut-away bottom portion of the thrust frame internal part 2b, whereby the guide plates 5a1 have been entirely omitted and the remainders of the tank wall 3 and internal frame part 2b have been omitted for simplicity.

The integration of the propellant management devices 5 in the arrangement supports the load-carrying function of the conically shaped engine thrust frame 2 in the area of the outlets of the tank 3, for introducing the engine loads into the primary structure 1. Namely, the propellant management devices 5 reinforce the internal frame part 2b in the critical load introduction area at the bottom of the tank. In that regard, the load path passes predominantly through the conically shaped engine thrust frame internal part 2b, so that no additional supports are needed.

Figure 5:
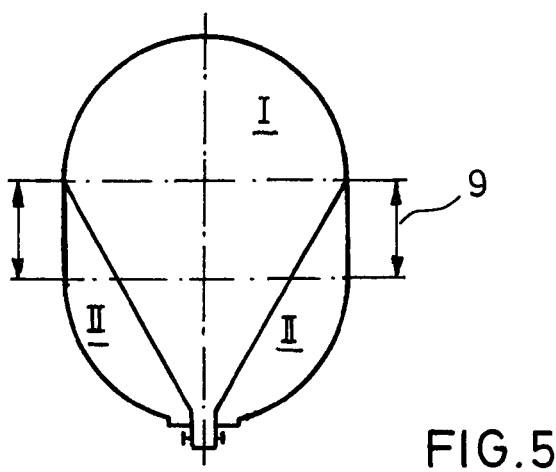
Figure 6:
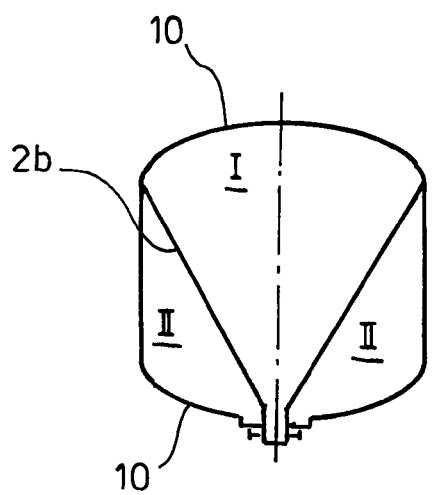
Figure 7:
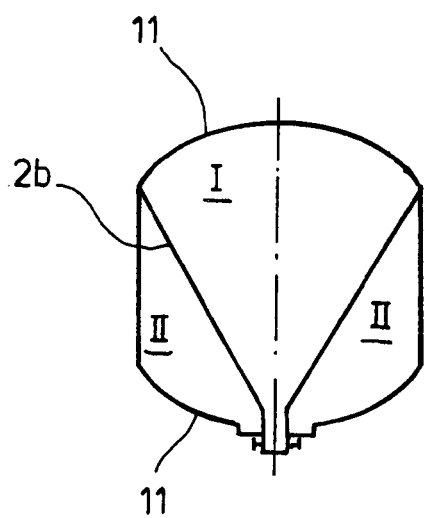

Because the optimization of the diameter and of the height of a rocket stage also depends on the configuration of the entire launcher or booster, it is important for an optimization of the launcher or booster capacity of a rocket stage, that the diameter and the length of the tank can be varied. A purely spherical shape of such a tank is not optimal in all cases, because relatively large empty volumes can arise in the rocket stage when using a purely spherical tank or purely hemispherical tank domes under certain circumstances, which can cause a launcher or booster stage to become unnecessarily large. Therefore, variants of tanks with different shapes as illustrated in FIGS. 5 to 7 lead to better adapted solutions in some cases. This can be a tank with a cylindrical intermediate piece 9 between hemispherical domes as shown in FIG. 5, a tank with essentially elliptical domes 10 according to FIG. 6, or a tank with hemispherical or partial spherical arcuate domes 11 as illustrated in FIG. 7.

Figure 8:
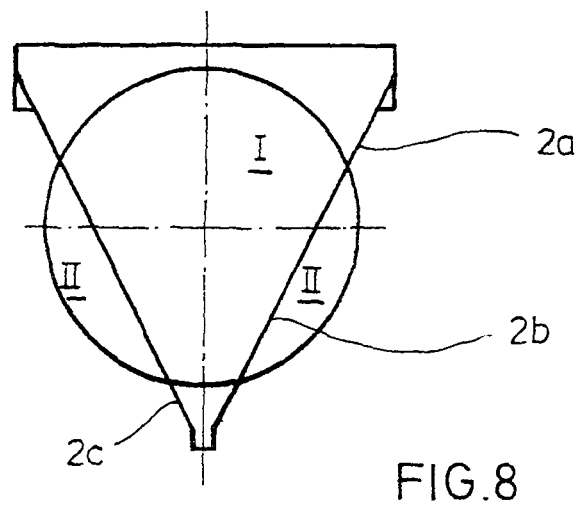
FIGS. 8, 9 are schematic sectional illustrations of alternative arrangements of engine thrust frames in tanks.
Figure 9:
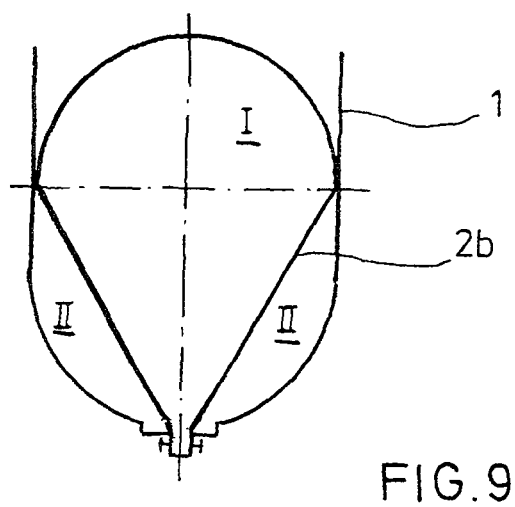

With regard to the essentially conically shaped engine thrust frame 2, the internal part 2b can be extended externally from the tank 3, at the top by a conically shaped ring 2a (the so-called Conical Tank Attachment Ring) for connection to the primary structure 1, and at the bottom by a cylindrical or conical tank extension or thrust frame extension 2c for connection to the engine 4, as shown in FIG. 8. In that regard, the extension 2c enables a better introduction of the actuator adjustment forces and of the engine forces. However, this arrangement is not quite as compact and simultaneously is more complex than one without such an extension 2c. On the other hand, in order to better utilize an existing volume, alternatively the conically shaped ring 2a can also be completely omitted, whereby the cylindrical primary structure 1 is connected to the thrust frame 2 and/or to the tank 3 directly adjoining the tank frame internal part 2b, as illustrated in FIG. 9. In such a case, however, the loads of the launcher or booster may be partly taken over by the tank shell.

Figure 10:
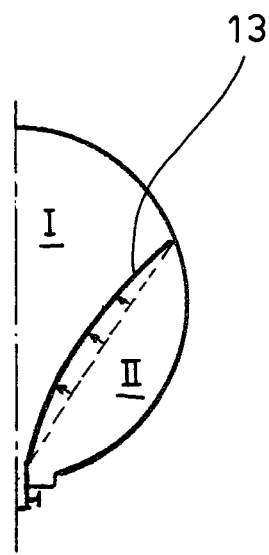
FIGS. 10, 11 are two further schematic partial sectional illustrations of alternative engine thrust frame shapes for a rocket stage.
Figure 11:
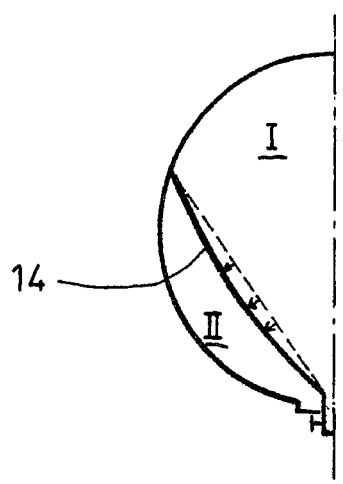

In the above described arrangements, the engine thrust frame is embodied conically shaped with a linear conical wall. Depending on the system requirements, however, it can also deviate from this shape. In FIGS. 10 and 11, frames with respectively bent or curved longitudinal surfaces of a generally conical shape are illustrated. This can be realized with a concave curve 13 as shown in FIG. 10, or with a convex curve as shown in FIG. 11. The selection of the optimal bend or curvature of the longitudinal surfaces of the engine thrust frame in that regard depends, among other things, on the differential pressure between the two tank chambers I and II, and further depends on the connection or junction point to the primary structure and on the necessary volumes of the two tank chambers I and II. In each case, in the consideration of bent or curved longitudinal surfaces, it must be ensured that the differential pressure is always effective in the direction of the bend or curvature, because otherwise there is a danger of forming a dent or bulge. When a pressure differential exists between the chambers I and II, even an initially straight or linear walled conical shape may bulge slightly to form a convex or concave conical shape, which tends to equilibrate the pressure conditions. With a curved wall shape, the load path of the engine loads is less advantageous, because it no longer forms a straight line, and the production of a conical structure with purposely curved walls is also more complex.

The terms "substantially" and "essentially" when used with shapes such as a substantially spherical shape of the tank, mean that the shape is predominantly as defined (e.g. spherical) and it is readily recognizable as the defined shape, but it may have slight deviations from that shape, or it may include minor parts that deviate from that shape.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A rocket stage for a spacecraft, comprising:
   an engine;
   a tank for storing a fuel and an oxidizer for combustion in said engine;
   a first refillable liquid reservoir;
   a second refillable liquid reservoir;
   a rocket stage primary structure; and
   an engine thrust frame that connects, and transmits forces between, said engine and said primary structure;
   wherein said engine thrust frame includes at least an internal part thereof arranged internally within said tank,
   wherein said internal part forms an imperforate partition that divides an interior space of said tank into at least two chambers for storing said fuel and said oxidizer separately from one another,
   wherein said first refillable liquid reservoir is arranged in communication with a first one of said at least two chambers and said second refillable liquid reservoir is arranged in communication with a second one of said at least two chambers, and
   wherein said second refillable liquid reservoir is arranged concentrically with said first refillable liquid reservoir at an end of said tank adjoining said engine and, said first refillable liquid reservoir and said second refillable liquid reservoir are bounded and separated from one another by said internal part of said engine thrust frame.

2. The rocket stage according to claim 1, wherein said primary structure is arranged at an opposite end of said tank relative to said end of said tank adjoining said engine.

3. The rocket stage according to claim 1, wherein no part of said engine thrust frame extends externally around said tank from said engine to said primary structure for transmitting forces between said engine and said primary structure.

4. The rocket stage according to claim 1, wherein said internal part is an entirety of said engine thrust frame, and all of said engine thrust frame is arranged internally within said tank.

5. The rocket stage according to claim 1, wherein said engine thrust frame further includes a first external part thereof arranged externally outside of said tank, and wherein said first external part is configured as a conical ring and connects said internal part for force transmission to said primary structure.

6. The rocket stage according to claim 1, wherein said engine thrust frame further includes a second external part thereof arranged externally outside of said tank, and wherein said second external part is configured as a conical ring or a cone and connects said internal part for force transmission to said engine.

7. The rocket stage according to claim 1, wherein said engine thrust frame further includes an external part thereof arranged externally outside of said tank, and wherein said external part is connected directly to or extends continuous with said internal part whereby said engine thrust frame penetrates through a tank wall of said tank.

8. The rocket stage according to claim 1, wherein said engine thrust frame further includes an external part thereof arranged externally outside of said tank, and wherein said external part is discontinuous from said internal part with a tank wall of said tank interposed therebetween, whereby said external part and said internal part are aligned with one another and connected on opposite sides of said tank wall for force transmission therebetween through a thickness of said tank wall.

9. The rocket stage according to claim 1, wherein said primary structure has a cylindrical configuration and is connected to said internal part of said engine thrust frame or to said tank adjoining said internal part for force transmission between said internal part and said primary structure, without a conical attachment ring interposed between said primary structure and said internal part or said tank.

10. The rocket stage according to claim 1, further comprising propellant guide plates that are adapted for collecting and guiding the fuel or the oxidizer, wherein the propellant guide plates protrude inwardly from and extend along said internal part of said engine thrust frame in said first one of said chambers.

11. The rocket stage according to claim 10, further comprising additional propellant guide plates that are adapted for collecting and guiding the oxidizer or the fuel, wherein the additional propellant guide plates protrude inwardly from and extend along a tank wall of said tank in said second one of said chambers.

12. The rocket stage according to claim 1, further comprising a disc-shaped reinforcement plate or rim interposed between and connecting said engine thrust frame to said engine.

13. The rocket stage according to claim 1, wherein said tank has a substantially spherical shape.

14. The rocket stage according to claim 1, wherein said tank includes a cylindrical tank wall portion and two end domes at opposite ends of said cylindrical tank wall portion.

15. The rocket stage according to claim 1, wherein said tank includes two substantially elliptically curved domes.

16. The rocket stage according to claim 1, wherein said tank includes two substantially partially spherically curved domes.

17. The rocket stage according to claim 1, wherein said internal part of said engine thrust frame has a substantially conical shape with a conical wall that extends linearly.

18. The rocket stage according to claim 1, wherein a vertex end of said engine thrust frame ends inside said tank, and further comprising a cylindrical extension that connects said vertex end to said engine.

19. The rocket stage according to claim 1, wherein said internal part of said engine thrust frame has a substantially conical shape with a conical wall that extends convexly.

20. The rocket stage according to claim 1, wherein said internal part of said engine thrust frame has a substantially conical shape with a conical wall that extends concavely.

* * * * *